United States Patent
Mittal et al.

(10) Patent No.: US 10,904,068 B2
(45) Date of Patent: Jan. 26, 2021

(54) SYSTEM AND METHOD TO PROVIDE SEAMLESS DATA PLACEMENT, DATA MOVEMENT, AND DATA MANAGEMENT INTO CLOUD

(71) Applicant: DATERA, INC., Sunnyvale, CA (US)

(72) Inventors: Shailesh Mittal, Santa Clara, CA (US); Raghu Krishnamurthy, Santa Clara, CA (US); Nir Frenkel, Santa Clara, CA (US); Ayush Sharma, Folsom, CA (US)

(73) Assignee: DATERA, INC., Sunnyvale, CA (US)

( * ) Notice: Subject to any disclaimer, the term of this patent is extended or adjusted under 35 U.S.C. 154(b) by 212 days.

(21) Appl. No.: 15/869,299

(22) Filed: Jan. 12, 2018

(65) Prior Publication Data
US 2019/0222467 A1 Jul. 18, 2019

(51) Int. Cl.
*H04L 12/24* (2006.01)
*G06F 3/06* (2006.01)
*H04L 29/08* (2006.01)

(52) U.S. Cl.
CPC .......... *H04L 41/022* (2013.01); *G06F 3/0605* (2013.01); *G06F 3/0647* (2013.01);
(Continued)

(58) Field of Classification Search
None
See application file for complete search history.

(56) References Cited

U.S. PATENT DOCUMENTS

| | | | |
|---|---|---|---|
| 9,336,060 B2 | 5/2016 | Nori et al. | |
| 9,680,708 B2 | 6/2017 | Kasturi | |

(Continued)

FOREIGN PATENT DOCUMENTS

AU 2017210624 A1 8/2017

OTHER PUBLICATIONS

NetApp, NetApp data fabric architecture fundamentals published on Mar. 1, 2017.
(Continued)

*Primary Examiner* — Sm A Rahman
*Assistant Examiner* — Dae Kim
(74) *Attorney, Agent, or Firm* — Barry Choobin; Patent 360

(57) ABSTRACT

Disclosed is a method and system to provide seamless data placement, data movement, and data management into the cloud. The system includes a processor; and a memory. The memory stores machine-readable instructions that when executed by the processor cause the processor to extend the local data fabric and the services to the cloud providers by utilizing a cloud abstraction layer module. The cloud providers act as remote endpoints configured with a source unit. The process is further configured to implement a data migration in which a data migration module migrates data from the source unit to the cloud providers, and performs a plurality of management activities through an interaction between a control plane and a management module. Then the processor is configured to create a cloud tenant in the source unit to map the cloud providers. The data is migrated to the cloud provider through a plurality of mechanisms selected from at least one of instantiating an application instance into a cloud tenant attached to the cloud provider, and utilizing a plurality of remote storage pools which includes a plurality of remote endpoints as members.

22 Claims, 4 Drawing Sheets

(52) U.S. Cl.
CPC ...... *H04L 67/1095* (2013.01); *H04L 67/1097* (2013.01); *H04L 67/2842* (2013.01); *H04L 67/025* (2013.01)

(56) References Cited

U.S. PATENT DOCUMENTS

| | | | |
|---|---|---|---|
| 9,740,566 B2 | 8/2017 | Zheng et al. | |
| 2010/0318609 A1* | 12/2010 | Lahiri | G06F 9/455 709/205 |
| 2010/0332479 A1* | 12/2010 | Prahlad | G06F 3/0649 707/741 |
| 2012/0096149 A1* | 4/2012 | Sunkara | G06F 9/5072 709/224 |
| 2012/0173822 A1* | 7/2012 | Testardi | G06F 11/1453 711/135 |
| 2013/0297800 A1* | 11/2013 | Considine | H04L 41/12 709/226 |
| 2014/0059226 A1* | 2/2014 | Messerli | G06F 9/5072 709/226 |
| 2015/0052517 A1 | 2/2015 | Raghu et al. | |
| 2015/0074743 A1 | 3/2015 | Ilieva et al. | |
| 2015/0312243 A1* | 10/2015 | Ponsford | G06F 21/6218 713/159 |
| 2017/0134301 A1 | 5/2017 | Chen et al. | |
| 2017/0139782 A1* | 5/2017 | Chen | G06F 16/27 |
| 2017/0171245 A1* | 6/2017 | Lee | G06F 16/86 |
| 2017/0264687 A1* | 9/2017 | Beerana | G06F 9/54 |
| 2018/0063235 A1* | 3/2018 | Beveridge | H04L 67/1021 |
| 2018/0302497 A1* | 10/2018 | Khasnabish | H04L 41/0813 |

OTHER PUBLICATIONS

Elastfile, Elastifile launches cross-cloud data fabric, freeing enterprise customers from traditional storage silos published on Apr. 5, 2017.

* cited by examiner

SYSTEM AND METHOD TO PROVIDE SEAMLESS DATA PLACEMENT, DATA MOVEMENT, AND DATA MANAGEMENT INTO CLOUD

TECHNICAL FIELD

The present invention relates to the extension of data fabric, in particular to system and method for extending a local data fabric and a plurality of services to a plurality of cloud providers.

BACKGROUND

Background description includes information that may be useful in understanding the present invention. It is not an admission that any of the information provided herein is prior art or relevant to the presently claimed invention, or that any publication specifically or implicitly referenced is prior art.

As the term suggests, data fabric "sews" together data management, data placement, performance optimization, and access management to enable storage resources to be automatically provisioned to requesting users or applications in a self-service manner. This means data can move between storage systems within a data center and/or to the cloud without changing user processes. It also means that it can have a specific set of quality of service (QoS) guarantees associated with it so the data responds to user requests in a consistent fashion. Traditionally, data fabric enables the users to quickly respond and realize the full potential of their hybrid cloud and make the best decisions for their business. Thus, the data fabric enables the users and/or devices to write or read data from the fabric with the access protocol of their choice.

Most storage systems focus on a single location, typically on-premises, and only supports a single access method i.e. typically file or block. The storage system that supports the cloud can typically only do so in a unidirectional fashion, and leverage the cloud solely as a giant data dumping ground. A data fabric is a solution that is as adroit running in the cloud as it is running on premises. The existing storage systems can seamlessly move data between locations (in both directions), not only for backup and archive but also for cloud bursting or application migration.

However, there is a dire need for a storage system that provides a self-service experience in which the users and applications do not have to wait for IT admin to respond to the requests. Further, there is also a need for a system and method to provide a seamless data placement across the local endpoints and/or remote endpoints adhering to the various data placement constraints. Furthermore, there is also a need for a mechanism to provide a seamless data management service extension from local fabric to the remote/cloud-based data fabric.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context.

The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

SUMMARY

The present invention mainly solves the technical problems existing in the prior art. In response to these problems, the present invention provides a system and method that extends a local data fabric and a plurality of services to a plurality of cloud providers.

An aspect of the present disclosure relates to a device in a network. The device includes a non-transitory storage device having embodied therein one or more routines operable to extend a local data fabric and a plurality of services to a plurality of cloud providers.

The one or more routines include a cloud abstraction layer module, a data migration module, a management module, and a creation module. The cloud abstraction layer module acts as remote endpoints configured with a source unit to extend the local data fabric and the services to the cloud providers. The data migration module migrates data from the source unit to the cloud providers and performs a plurality of management activities through an interaction between a control plane and a management module. The creation module creates a cloud tenant in the source unit to map the cloud providers. The data is migrated to the cloud provider through a plurality of mechanisms selected from at least one of instantiating an application instance into a cloud tenant attached to the cloud provider and utilizing a plurality of remote storage pools which includes a plurality of remote endpoints as members.

In an aspect, the cloud abstraction layer module provides an interface to evaluate the cloud endpoints in case the cloud endpoints are backed by native data stores of the cloud providers, further the cloud abstraction layer module translates a plurality of cloud-based policies to the native format of the source unit.

In an aspect, the cloud abstraction layer module functions as a remote controller and the plurality of services are contained in closed API format for consumption of the source unit.

In an aspect, the plurality of management activities selected from at least one of scheduled snapshots, user-triggered snapshots, quality of services (QoS), tenancy based quota restrictions, and/or combination thereof.

In an aspect, the management module presents the data in the cloud to cloud-based services, wherein the presentation is either in the native format of the cloud providers or as a file for network file system (NFS) access.

In an aspect, the remote storage pools provide an accurate data placement in the cloud provider.

In an aspect, the management module triggers a corresponding data management operation, in case the data is owned by the cloud provider, for the corresponding cloud provider and report a status of operation back to the control plane to provide an integrated pane.

In an aspect, the cloud provider publishes specific operations to the control plane that the source unit may trigger later on.

An aspect of the present disclosure relates to extending a local data fabric and a plurality of services to a plurality of cloud providers. The system includes a processor and a memory. The memory stores machine-readable instructions that when executed by the processor cause the processor to extend the local data fabric and the services to the cloud providers by utilizing a cloud abstraction layer module, wherein the cloud providers act as remote endpoints configured with a source unit. Further, the processor implements a data migration in which a data migration module migrates data from the source unit to the cloud providers, and performs a plurality of management activities through an interaction between a control plane and a management module. Furthermore, the processor creates a cloud tenant in the source unit to map the cloud providers, wherein the data is migrated to the cloud provider through a plurality of mechanisms selected from at least one of instantiating an application instance into a cloud tenant attached to the cloud provider, and utilizing a plurality of remote storage pools which includes a plurality of remote endpoints as members.

An aspect of the present disclosure relates to a method for extending a local data fabric and a plurality of services to a plurality of cloud providers. The method includes the step of extending, by one or more processors, a local data fabric and a plurality of services to a plurality of cloud providers by utilizing a cloud abstraction layer module. In an aspect, the cloud providers act as remote endpoints configured with a source unit. The method then includes the step of implementing, by one or more processors, a data migration in which a data migration module migrates data from the source unit to the cloud providers, and performing a plurality of management activities through an interaction between a control plane and a management module.

Further, the method includes the step of creating, by one or more processors, a cloud tenant in the source unit to map the cloud providers. In an aspect, the data is migrated to the cloud provider through a plurality of mechanisms selected from at least one of instantiating an application instance into a cloud tenant attached to the cloud provider and utilizing a plurality of remote storage pools which includes a plurality of remote endpoints as members.

Accordingly, one advantage of the present invention is that it provides a seamless data placement across the local endpoints and/or remote endpoints adhering to the various data placement constraints.

Another advantage of the present invention is that it provides a seamless data management service extension from local fabric to the remote/cloud-based data fabric. Therefore, the data management and data control services can be extended out to the cloud platform to provide uniformity.

Still another advantage of the present invention is that it provides a novel mechanism of seamless data movement, as local endpoints and remote endpoints enter into or out of the resource pool that spans across local and remote fabric by utilizing resource pools for a tenant.

The aforementioned features and advantages of the present disclosure may be appreciated by reviewing the following description of the present disclosure, along with the accompanying figures wherein like reference numerals refer to like parts.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are disclosed for extending a local data fabric and a plurality of services to a plurality of cloud providers. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of extending the local data fabric and a plurality of services to a plurality of cloud providers, it should be appreciated that the same has been done merely to illustrate the invention in an exemplary manner and any other purpose or function for which explained structures or configurations can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include but are not limited to, a magnetic disk or tape, optical storage media such as compact disk (CD) or digital versatile disk (DVD), flash memory, memory or memory devices.

A computer program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer program product) may be stored in a machine-readable medium. A processor(s) may perform the necessary tasks.

The data fabric extension mechanism provided by the present invention includes various advantages such as seamless data access for applications running at either end of extended fabric; engagement of the data management services and policy framework to remote providers; extension of the native storage pools; providing failure domain and the data placement algorithms to the remote providers; enabling the remote provider services through the native control plane services; vendor (remote cloud provider) extensions in native policies for the custom behavior handling for a remote provider inside the native plane; providing a single pane of data management for local and remote data provider and objects; Invisible data replication by instantiating applications with remote tenants and storage pools; providing seamless data replication across the multiple clouds and multiple formats extended through the data fabric.

Figure 1:
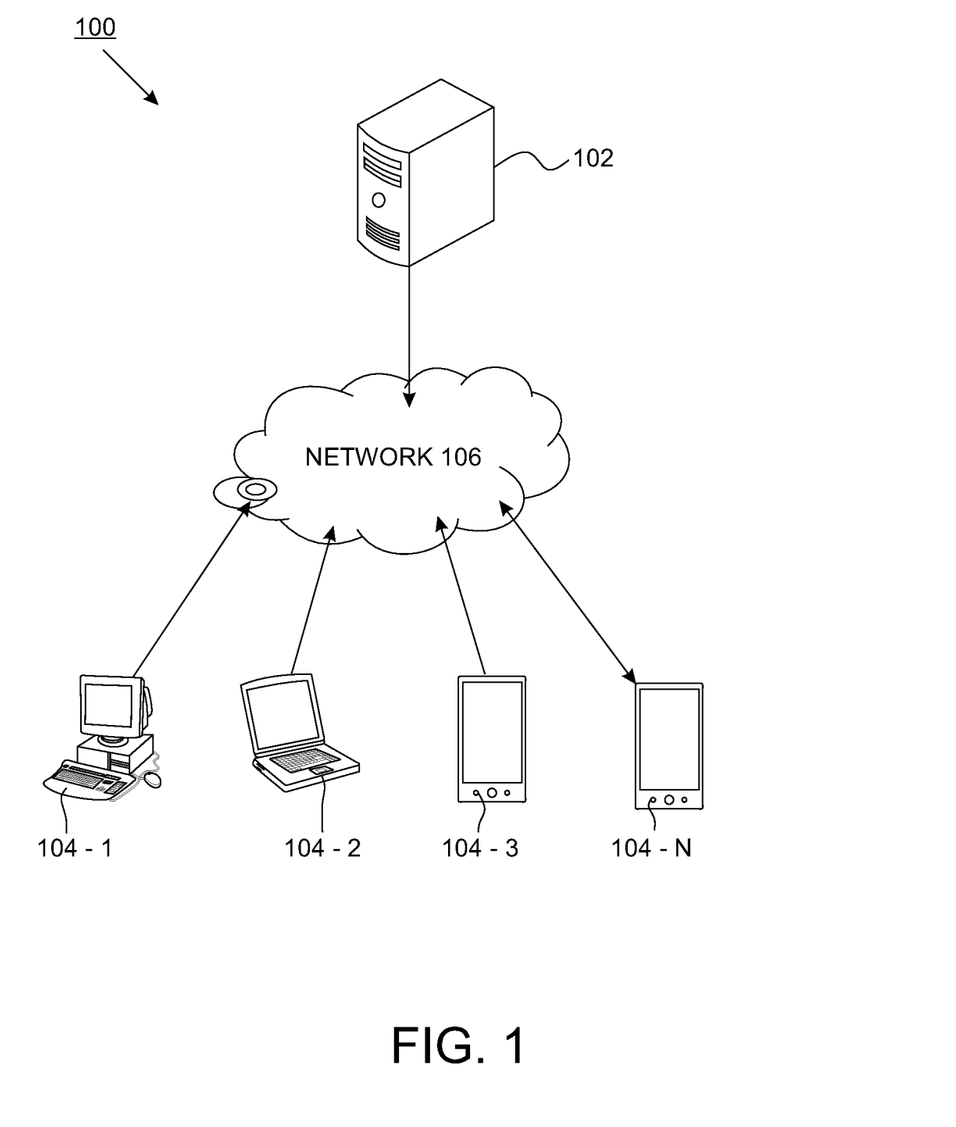
FIG. 1 illustrates a network implementation of a system and method for extending a local data fabric and a plurality of services to a plurality of cloud providers, in accordance with an embodiment of the present subject matter.

FIG. 1 illustrates a network implementation 100 of a system and method for extending a local data fabric and a plurality of services to a plurality of cloud providers, in accordance with an embodiment of the present subject matter. Although the present subject matter is explained considering that the present system 102 is implemented on a server, it may be understood that the present system 102 may also be implemented in a variety of computing systems, such as a laptop computer, a desktop computer, a notebook, a workstation, a mainframe computer, a server, a network server, and the like. It will be understood that the present system 102 may be accessed by multiple users through one or more user devices 104-1, 104-2 . . . 104-N, collectively referred to as user 104 hereinafter, or applications residing on the user devices 104. Examples of the user devices 104 may include but are not limited to, a portable computer, a personal digital assistant, a handheld device, and a workstation. The user devices 104 are communicatively coupled to the present system 102 through a network 106.

In one implementation, the network 106 may be a wireless network, a wired network or a combination thereof. The network 106 can be implemented as one of the different types of networks, such as an intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
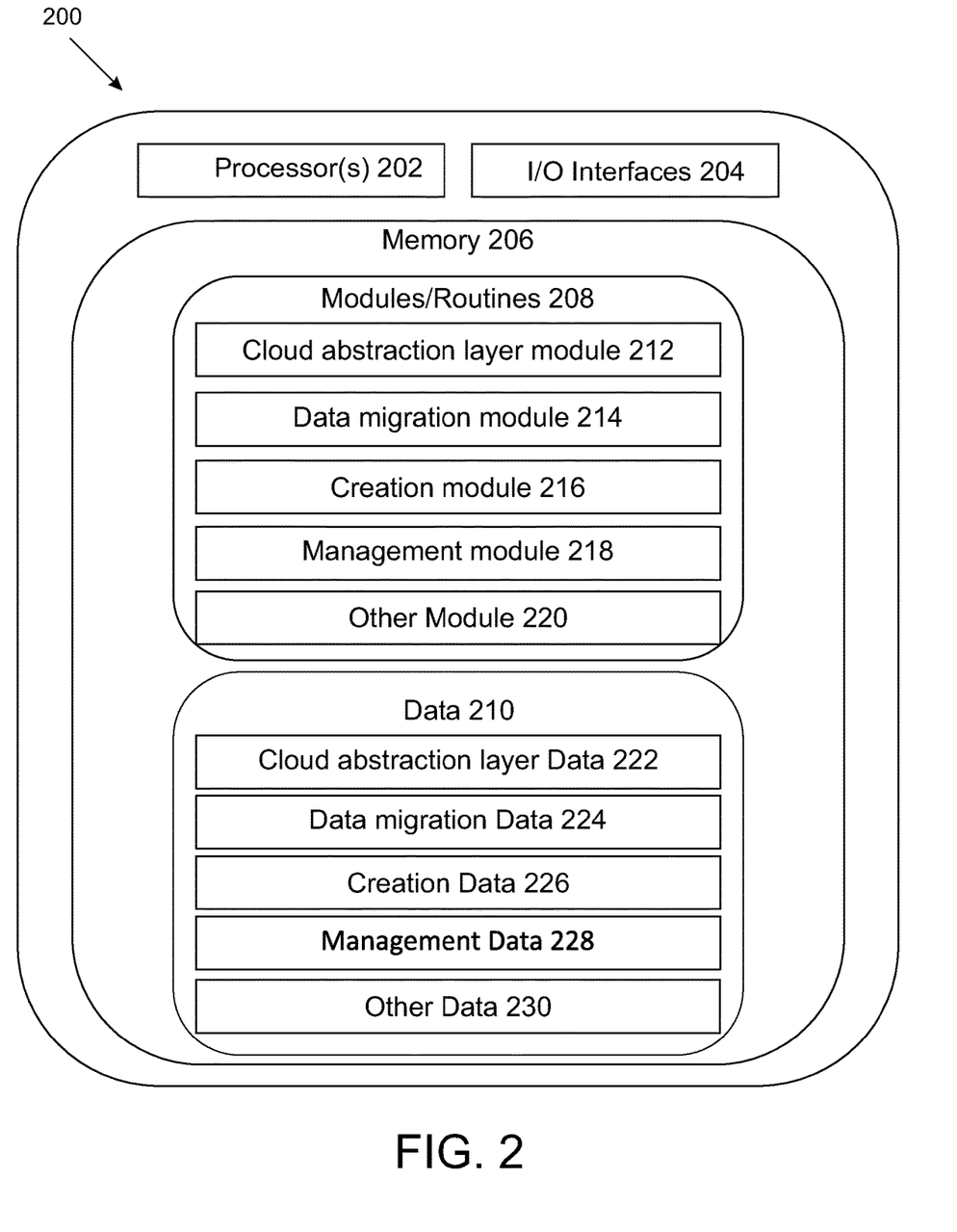
FIG. 2 illustrates the proposed system to extend a local data fabric and a plurality of services to a plurality of cloud providers, in accordance with an embodiment of the present subject matter.

FIG. 2 illustrates the proposed system 200 (indicated as 102 in FIG. 1) to extend a local data fabric and a plurality of services to a plurality of cloud providers, in accordance with an embodiment of the present subject matter. FIG. 2 is explained in conjunction with FIG. 1. In one embodiment, the system 200 may include at least one processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 200 to interact with a user directly or through the client devices 104. Further, the I/O interface 204 may enable the system 200 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may a cloud abstraction layer module 212, a data migration module 214, a management module 218, and a creation module 216 and other modules 220. The other modules 220 may include programs or coded instructions that supplement applications and functions of the system 200.

The data 210, amongst other things, serves as a repository for storing data processed, received, and generated by one or more of the modules 208. The data 210 may also include a cloud abstraction layer data 222, a data migration data 224, a management data 228, a creation data 226 and other data 230. The other data 230 may include data generated as a result of the execution of one or more modules in the other module 220.

In one implementation, a cloud abstraction layer module 212 acts as remote endpoints configured with a source unit to extend the local data fabric and the services to the cloud providers. In one embodiment, the cloud abstraction layer module 212 provides an interface to evaluate the cloud endpoints in case the cloud endpoints are backed by native data stores of the cloud providers, further the cloud abstraction layer module 212 translates a plurality of cloud-based policies to the native format of the source unit.

In one embodiment, the cloud abstraction layer module 212 functions as a remote controller and the plurality of services are contained in closed API format for consumption of the source unit.

The data migration module 214 migrates data from the source unit to the cloud providers and performs a plurality of management activities through an interaction between a control plane and a management module 218. The management module 218 presents the data in the cloud to cloud-based services. In an embodiment, the presentation is either in the native format of the cloud providers or as a file for network file system (NFS) access.

Further, the management module 218 triggers a corresponding data management operation, in case the data is owned by the cloud provider, for the corresponding cloud provider and report a status of operation back to the control plane to provide an integrated pane.

In an embodiment, the plurality of management activities selected from at least one of scheduled snapshots, user-triggered snapshots, quality of services (QoS), and tenancy based quota restrictions, and/or combination thereof.

The creation module 216 is configured to create a cloud tenant in the source unit to map the cloud providers. In an embodiment, the data is migrated to the cloud provider through a plurality of mechanisms selected from at least one of instantiating an application instance into a cloud tenant attached to the cloud provider and utilizing a plurality of remote storage pools which includes a plurality of remote endpoints as members. The remote storage pools provide an accurate data placement in the cloud provider. Further, the cloud provider publishes specific operations to the control plane that the source unit may trigger later on.

As used herein, and unless the context dictates otherwise, the term "configured to" or "coupled to" is intended to include both direct coupling (in which two elements that are coupled to each other contact each other) and indirect coupling (in which at least one additional element is located between the two elements). Therefore, the terms "configured to", "configured with", "coupled to" and "coupled with" are used synonymously. Within the context of this document terms "configured to", "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Figure 3:
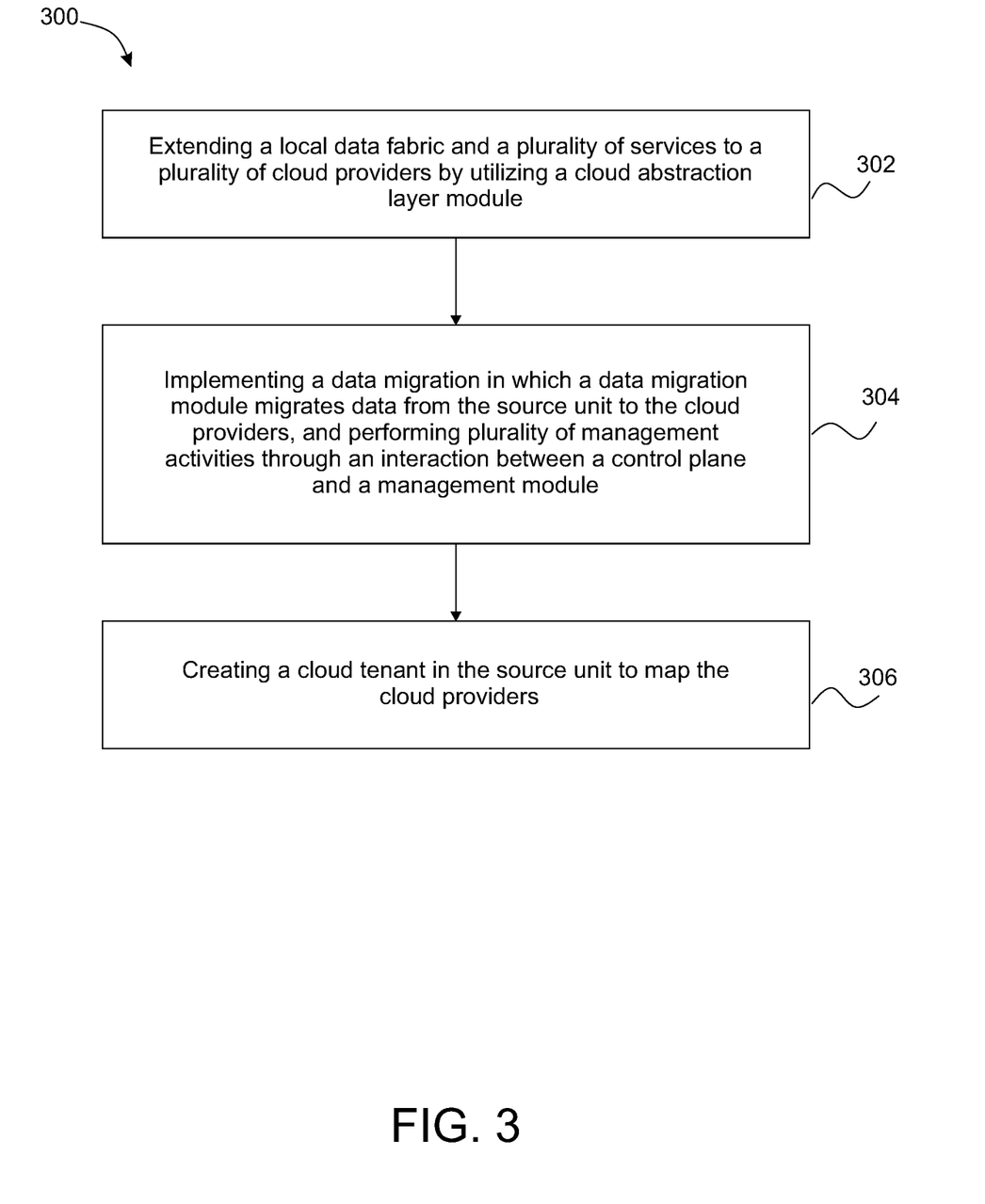
FIG. 3 illustrates a flowchart of the method for extending a local data fabric and a plurality of services to a plurality of cloud providers, in accordance with at least one embodiment.

FIG. 3 illustrates a flowchart 300 of the method for extending a local data fabric and a plurality of services to a plurality of cloud providers, in accordance with at least one embodiment. The method initiates with the step 302 of extending, by one or more processors, a local data fabric and a plurality of services to a plurality of cloud providers by utilizing a cloud abstraction layer module, wherein the cloud providers act as remote endpoints configured with a source unit.

Then the method includes the step 304 of implementing, by one or more processors, a data migration in which a data migration module migrates data from the source unit to the cloud providers, and performing a plurality of management activities through an interaction between a control plane and a management module. Further, the method includes the step 306 of creating, by one or more processors, a cloud tenant in the source unit to map the cloud providers. In an embodiment, the data is migrated to the cloud provider through a plurality of mechanisms selected from at least one of instantiating an application instance into a cloud tenant attached to the cloud provider and utilizing a plurality of remote storage pools which includes a plurality of remote endpoints as members.

Figure 4:
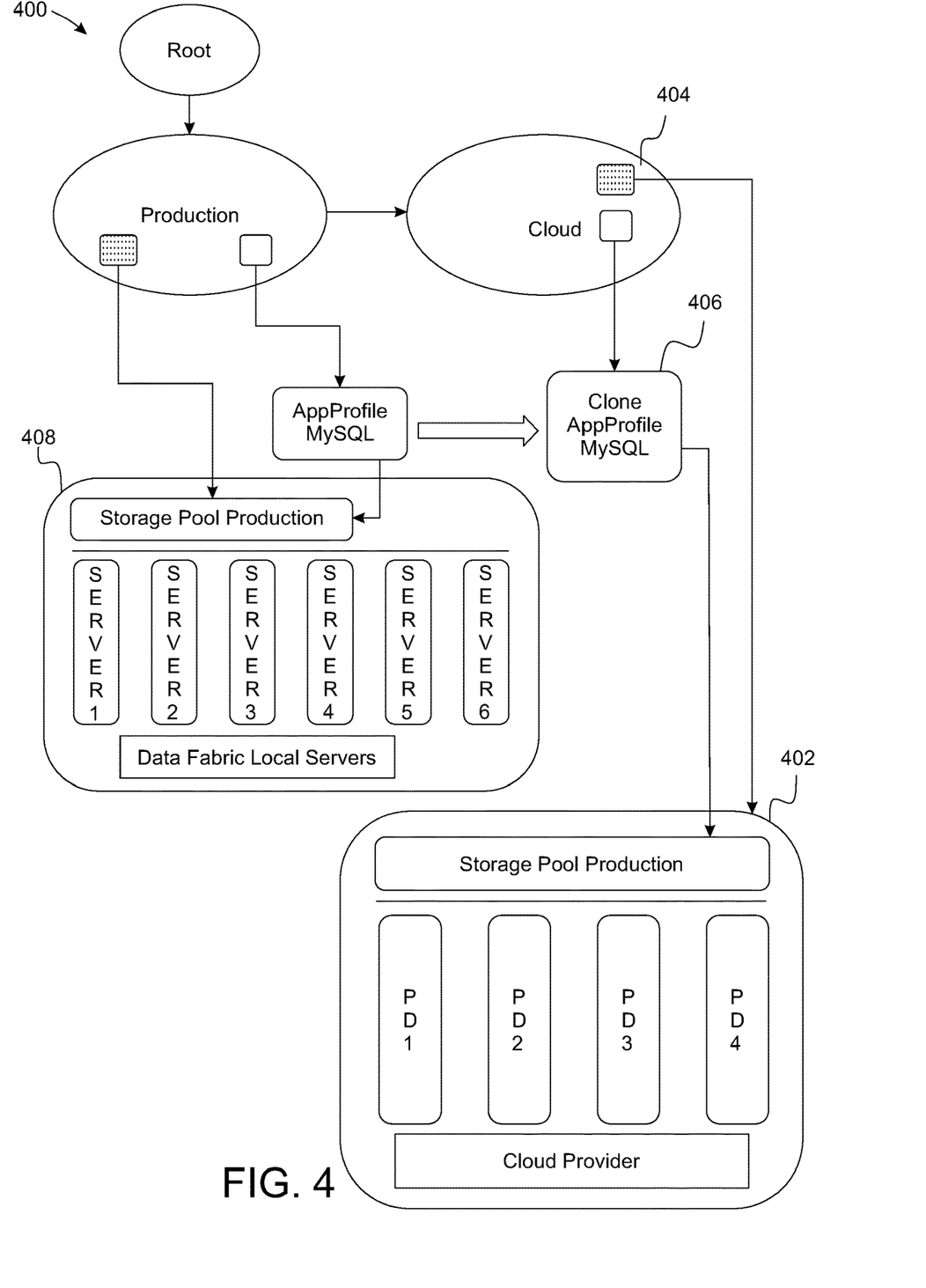
FIG. 4 illustrates an exemplary block diagram of the method for extending a local data fabric and a plurality of services to a plurality of cloud providers, in accordance with at least one embodiment.

FIG. 4 illustrates an exemplary block diagram 400 of the method for extending a local data fabric and a plurality of services to a plurality of cloud providers 404, in accordance with at least one embodiment. Thus the present invention provides a natural extension to the data Fabric for any remote cloud provider. The present invention provides efficient data placement based on various factors such as tenancy for storage pools, export interfaces and ACLs; performance required such as flash/hybrid; and failure domains. Further, the management services for data includes but not limited to snapshots (scheduled or user triggered) or clone, QoS, and tenancy based quota restrictions. The control plane includes its core layer built to follow all the basic principles of placement, optimization, and management. The cloud/remote providers have their own ways for data configurations and management services. The present invention brings the remote providers into the present native extension. Additionally, the native placement rules and management services may be used by the remote providers.

Further, the cloud abstraction layer module utilized by the present system and method runs as a remote controller with cloud environments managed with k8s. The control plane interacts with the management module to perform data migration and other management activities. The management module is also responsible for presenting the data in the cloud to cloud-based services, either in a cloud-native format such as Google persistent disk (PD), Amazon EBS (Elastic Block Store) or as a file for NFS access (Network File System). Additionally, the cloud Abstraction layer provides an interface to deal with remote endpoints when they are backed by cloud-native data stores. The cloud abstraction layer module is responsible for the operations like scheduled snapshots, clones, restores. The cloud abstraction layer module is also responsible for translating cloud-based policies to the native format. Thus provides a two-way mapping for behaviors combine with abv point.

The mechanism of providing the seamless data replication to the remote provider enables the present invention to migrate the data to the remote provider either by instantiating the application instance into remote tenant 406 that has a remote provider attached to it or by using a remote storage pool 408 (a pool that has remote endpoints as its members). In an embodiment, the data can be explicitly be replicated to the remote provider using Remote-backup operation. By configuring the remote storage pools, one can guarantee the data placement in the remote provider at the desired location. Using certain media type for specific data would be a prime example. All the data management operation on the remote data can be performed by the native system.

Further, the mechanism of the seamless on/off-boarding of clouds and data migration enables the present invention to add remote cloud providers to the native system. All the remote endpoints (like google PD, object store or EBS) are configured in the native system. The storage pools can be created based on media type, cloud provider. A remote tenant is created in the system to map the remote cloud provider. Also, all the workloads that need to place data into cloud provider are instantiated in that remote tenant. Alternatively, data can be migrated to the remote cloud providers by pointing to remote storage pools. All the native services around data protection, performance, and access control remain consistent irrespective of the data location.

Thus the present invention enables rich native services on the remote clouds as well and provides a single pane of management for remote and local data. Further, the present invention provides access to the cloud-based services with the native vendor service extension. Furthermore, the present invention provides ease of the data availability among the different clouds along with the efficient integration with the management frameworks like K8S.

The feature of the seamless access to the data from a local or remote service enables the applications to run locally or in a remote cloud. They need to have seamless access to the data irrespective of the data location. If a service is running in the remote cloud and data is present off-site in a data system, data can be accessed in various ways such as mounting data from the native block device in the cloud; if a remote copy is present in the cloud, management module detects the same and presents the remote data (from the cloud) to the service running in the remote provider; and if the data is required to be accessed in the cloud-native format, DMM would create the required device in the cloud. If the application is moved from cloud to local on premise, the local copy would be accessed or data will be replicated before can be accessed.

The present invention provides a single pane of management for remote and local data. Therefore, if the data is owned by the remote provider, the management module triggers a corresponding data management operation for that remote provider and report the status of the operation back to the native control plane. If data media requirement changes, the native control plane directs management module moves the data to appropriate media in the remote provider.

Furthermore, the present invention provides access to the cloud services with native vendor service extensions. Thus the remote provider can publish its specific operations to the native control plane that native system can trigger later on. This extends the present data fabric's capability to trigger remote provider's native operations from the native management plane itself. Along with vendor extensions, the native policies can carry vendor foot-print to have a custom mapping of behavior for remote data. For example, a cloud-based performance policy set as GOLD might map to 10 k IOPS whereas in the native system it is set to 50 k IOPS. A performance policy may carry vendor data to highlight the same and ensure the native control plane applies the policy appropriately based on the locality of the data.

The term "and/or" means that "and" applies to some embodiments and "or" applies to some embodiments. Thus, A, B, and/or C can be replaced with A, B, and C wrote in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

Where the specification claims refer to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

The invention claimed is:

1. A method implemented by one or more processors, the method comprising steps of:
   extending, by one or more processors, a local data fabric and a plurality of services to a plurality of cloud providers by utilizing a cloud abstraction layer module to provide a seamless data placement across local endpoints or remote endpoints adhering to data placement constraints selected from at least one of flash, low-performant, and cost-optimized, wherein the cloud abstraction layer module functions as a remote controller and the plurality of services are contained in closed API format for consumption of source unit, wherein the cloud providers act as remote endpoints configured with a source unit to enable the cloud provider services through a source control plane service;
   implementing, by one or more processors, a seamless data migration in which a data migration module migrates data from the source unit to the cloud providers, and performs a plurality of management activities through an interaction between the source control plane services and a management module which provides a seamless data management into cloud, wherein the plurality of management activities selected from at least one of scheduled snapshots, user-triggered snapshots, quality of services (QoS), tenancy based quota restrictions, and/or combination thereof; and
   creating, by one or more processors, a cloud tenant in the source unit to map the cloud providers, wherein the data is migrated to the cloud provider through a plurality of mechanisms selected from at least one of instantiating an application instance into the cloud tenant attached to the cloud provider, utilizing a plurality of remote storage pools which includes a plurality of remote endpoints as members and/or combination thereof, wherein the remote storage pools for seamless data movement between local endpoints and remote endpoints enter into a resource pool or out of the resource pool.

2. The method according to claim 1, wherein the cloud abstraction layer module provides an interface to evaluate the cloud endpoints in case the cloud endpoints are backed by native data stores of the cloud providers, further the cloud abstraction layer module translates a plurality of cloud-based policies to a native format of the source unit.

3. The method according to claim 1 further provides a seamless data replication across a plurality of cloud providers and a plurality of formats extended through the local data fabric.

4. The method according to claim 1 further provides an invisible data replication by instantiating a plurality of applications with the cloud tenant and the remote storage pools.

5. The method according to claim 1, wherein the management module presents the data in the cloud to cloud-based services, wherein the presentation is either in the native format of the cloud providers or as a file for network file system (NFS) access.

6. The method according to claim 1, wherein the remote storage pools provide an accurate data placement in the cloud provider.

7. The method according to claim 1, wherein the management module triggers a corresponding data management operation, in case the data is owned by the cloud provider, for the corresponding cloud provider and report a status of operation back to the control plane to provide an integrated pane.

8. The method according to claim 1, wherein the cloud provider publishes specific operations to the control plane that the source unit may trigger later on.

9. A device in a network, comprising:
a non-transitory storage device having embodied therein one or more routines operable to extend a local data fabric and a plurality of services to a plurality of cloud providers; and
one or more processors coupled to the non-transitory storage device and operable to execute the one or more routines, wherein the one or more routines include:
a cloud abstraction layer module acts as remote endpoints configured with a source unit to extend the local data fabric and the services to the cloud providers and further provides a seamless data placement across local endpoints or remote endpoints adhering to data placement constraints selected from at least one of flash, low-performant, and cost-optimized, wherein the cloud abstraction layer module functions as a remote controller and the plurality of services are contained in closed API format for consumption of the source unit;
a data migration module migrates data from the source unit to the cloud providers, and performs a plurality of management activities through an interaction between a source control plane service and a management module, wherein the plurality of management activities selected from at least one of scheduled snapshots, user-triggered snapshots, quality of services (QoS), tenancy based quota restrictions, and/or combination thereof; and
a creation module to create a cloud tenant in the source unit to map the cloud providers, wherein the data is migrated to the cloud provider through a plurality of mechanisms selected from at least one of instantiating an application instance into the cloud tenant attached to the cloud provider, utilizing a plurality of remote storage pools which includes a plurality of remote endpoints as members and/or combination thereof, wherein the remote storage pools for seamless data movement between local endpoints and remote endpoints enter into a resource pool or out of the resource pool.

10. The device as claimed in claim 9, wherein the cloud abstraction layer module provides an interface to evaluate the cloud endpoints in case the cloud endpoints are backed by native data stores of the cloud providers, further the cloud abstraction layer module translates a plurality of cloud-based policies to a native format of the source unit.

11. The device as claimed in claim 9 further provides a seamless data replication across a plurality of cloud providers and a plurality of formats extended through the local data fabric.

12. The device as claimed in claim 9 further provides an invisible data replication by instantiating a plurality of applications with the cloud tenant and the remote storage pools.

13. The device as claimed in claim 9, wherein the management module presents the data in the cloud to cloud-based services, wherein the presentation is either in the native format of the cloud providers or as a file for network file system (NFS) access.

14. The device as claimed in claim 9, wherein the remote storage pools provide an accurate data placement in the cloud provider.

15. The device as claimed in claim 9, wherein the management module triggers a corresponding data management operation, in case the data is owned by the cloud provider, for the corresponding cloud provider and report a status of operation back to the control plane to provide an integrated pane.

16. The device as claimed in claim 9, wherein the cloud provider publishes specific operations to the control plane that the source unit may trigger later on.

17. A system to provide seamless data placement, seamless data movement, and seamless data management into cloud, the system comprising:
a processor; and
a memory to store machine readable instructions that when executed by the processor cause the processor to:
extend the local data fabric and the services to the cloud providers by utilizing a cloud abstraction layer module, wherein the cloud providers act as remote endpoints configured with a source unit, wherein the cloud abstraction layer module functions as a remote controller and the plurality of services are contained in closed API format for consumption of source unit;
implement a data migration in which a data migration module migrates data from the source unit to the cloud providers, and performs a plurality of management activities through an interaction between a control plane and a management module, wherein the plurality of management activities selected from at least one of scheduled snapshots, user-triggered snapshots, quality of services (QoS), tenancy based quota restrictions, and/or combination thereof; and
create a cloud tenant in the source unit to map the cloud providers, wherein the data is migrated to the cloud provider through a plurality of mechanisms selected from at least one of instantiating an application instance into the cloud tenant attached to the cloud provider, and utilizing a plurality of remote storage pools which includes a plurality of remote endpoints as members, wherein the remote storage pools for seamless data movement between local endpoints and remote endpoints enter into a resource pool or out of the resource pool.

18. The system as claimed in claim 17, wherein the cloud abstraction layer module provides an interface to evaluate the cloud endpoints in case the cloud endpoints are backed by native data stores of the cloud providers, further, the cloud abstraction layer module translates a plurality of cloud-based policies to the native format of the source unit.

19. The system as claimed in claim 17, wherein the management module presents the data in the cloud to cloud-based services, wherein the presentation is either in the native format of the cloud providers or as a file for network file system (NFS) access.

20. The system as claimed in claim 17, wherein the remote storage pools provide an accurate data placement in the cloud provider.

21. The system as claimed in claim 17, wherein the management module triggers a corresponding data management operation, in case the data is owned by the cloud provider, for the corresponding cloud provider and report a status of operation back to the control plane to provide an integrated pane.

22. The system as claimed in claim 17, wherein the cloud provider publishes specific operations to the control plane that the source unit may trigger later on.

* * * * *